Smith & Cowles.
Horse Rake.

N° 2263
" 33267

Patented Sep. 10, 1861.

Witnesses.
Francis S. Low
M. Haskell

Inventor.
Edward Smith
Sidney Cowles

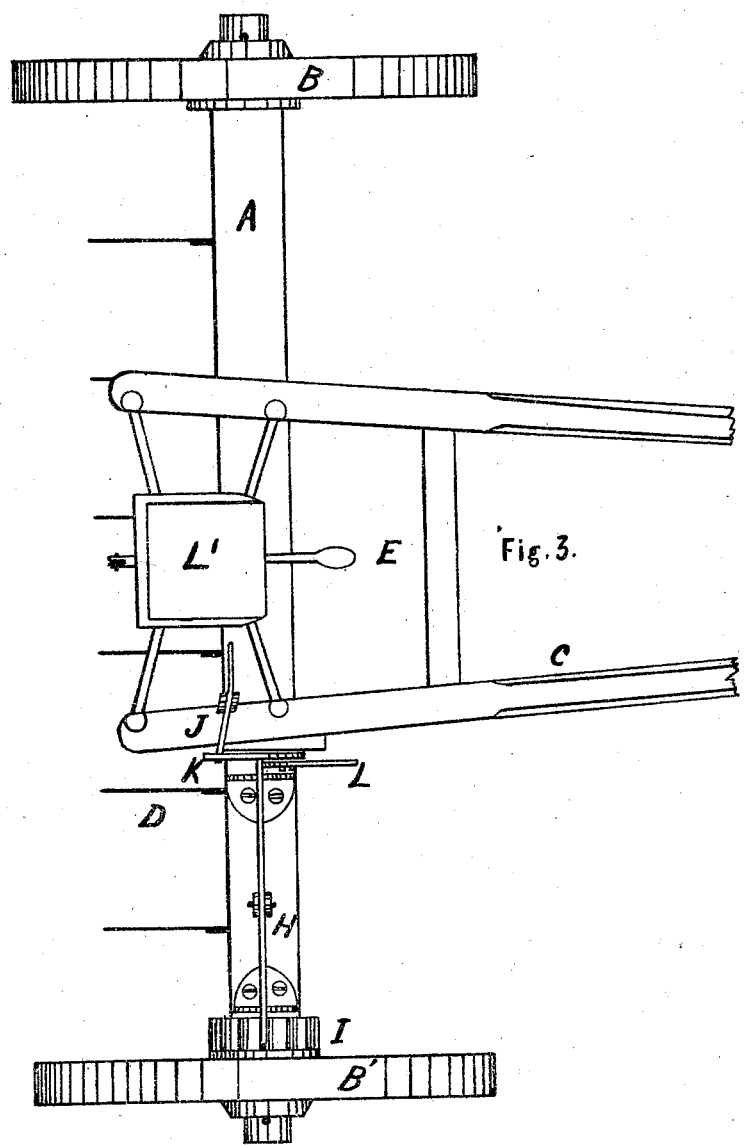

UNITED STATES PATENT OFFICE.

EDWARD SMITH AND SIDNEY COWLES, OF NORTHFORD, CONNECTICUT.

IMPROVEMENT IN HORSE-RAKES.

Specification forming part of Letters Patent No. 33,267, dated September 10, 1861.

*To all whom it may concern:*

Be it known that we, EDWARD SMITH and SIDNEY COWLES, both of Northford, in the county of New Haven and State of Connecticut, have invented certain new and useful Improvements in Horse-Rakes; and we do hereby declare that the following is a full and exact description of the construction and operation of the same, reference being had to the accompanying drawings, and to the letters of reference marked thereon, in which—

Figure 1:
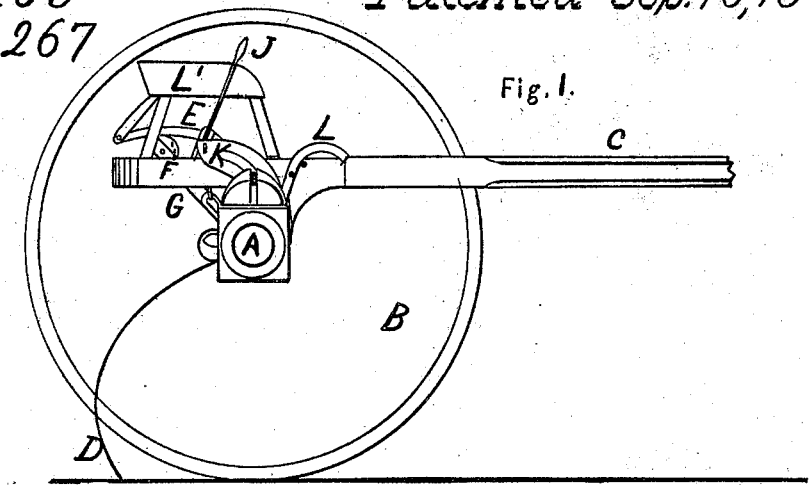
Figure 2:
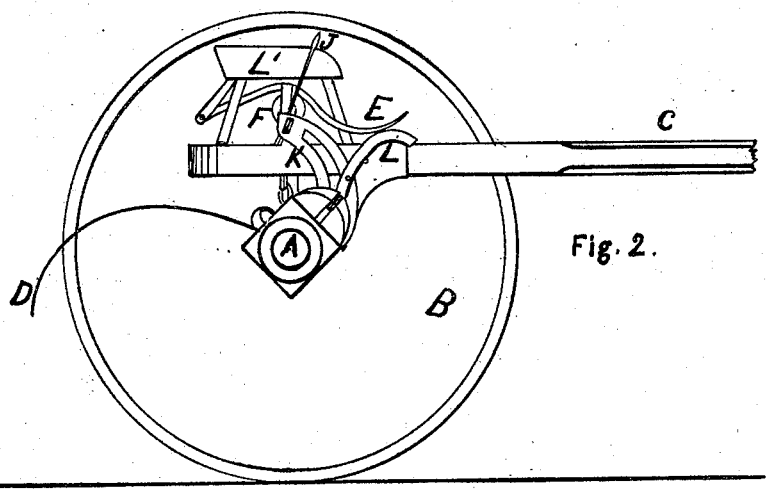
Figure 4:
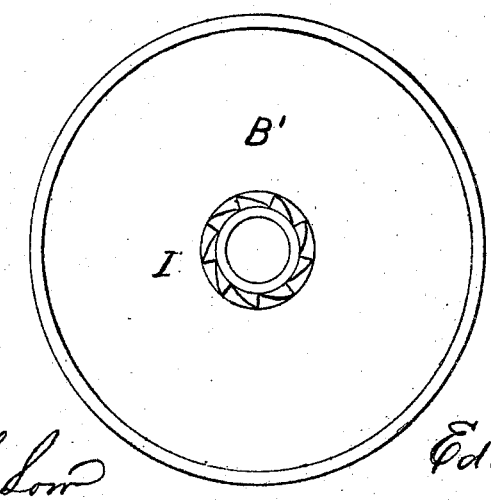

Figure 1 is an end elevation of the machine or implement with the near wheel removed, showing the rake-teeth depressed, ready to gather its load of grass, hay, or other material. Fig. 2 is a similar view, showing the rake-teeth as elevated to drop their gathered load, or to permit the machine to be moved about without having the rake-teeth operate. Fig. 3 is a plan view of the machine; and Fig. 4 an elevation of the inside of the near wheel, showing the ratchet-wheel by which the rake-teeth are elevated.

A is the axle-tree of the machine, supported upon and by the truck-wheels B B', which revolve upon it in the usual manner.

C are the shafts, to which the animal by which the machine is drawn is attached. They are secured to the axle-tree by a pivoted joint, so that the latter can turn a portion of a revolution to raise the rake-teeth from the ground, as hereinafter described.

D are the rake-teeth, secured to the axle-tree A in the ordinary manner, and so formed that they possess sufficient elasticity to permit them to raise or spring over stones and other obstacles of a small size that may lie in their track. They are kept in contact with the surface of the ground to gather up into heaps the hay, grass, or other material to be gathered by the curved lever E working upon and over the pulley F on the arm G, attached to the axle-tree, which lever is operated by the foot of the person who directs the operation of the machine. They are elevated from the ground to deliver their gathered load or to allow the machine to be moved about without having them operate by the operator forcing the outer end of the lever H into contact with the teeth of the ratchet-wheel I on the inside of the near wheel, B', by pulling toward him the handle of the bell-crank lever J, the lower end of which lever is connected with the curved lever K, which has a curved groove formed in it in which the inner end of the lever H is placed and worked, by which the movement of that wheel of the machine is employed to raise the rake-teeth and their gathered load, instead of having that object effected by the strength of the operator. The rake-teeth, when thus raised, are kept up by the pawl L, which is pivoted to the lower end of the curved lever K, dropping upon and over the inner end of the lever H and holding it, and through it the axle-tree A, until the pawl is released and the axle-tree allowed to turn back and the rake-teeth to drop to the ground, to be operated in raking as before. The pawl is released from contact with the inner end of the lever H by the operator pulling toward him the handle of the bell-crank lever J, the front of the pawl resting against a pin on the side of one of the shafts C, elevating thereby the curved lever K and raising the pawl against the pin named, so that its lower end moves off from the lever H, releasing that lever and allowing the rake-teeth to drop to the ground by their weight, and, by the pressure of the foot of the operator upon the lever E, acting upon the axle-tree to turn it back to its first position. L' is a seat for the person operating the machine, so placed upon the shafts C that the lever E shall be within reach of his foot and the handle of the bell-crank lever J in reach of his hand, so that they can both be readily operated at the proper time.

When the machine is to be moved about from place to place the rake-teeth are elevated and kept up from the ground, as shown in Fig. 2, and when it is to be operated the rake-teeth are depressed and brought in contact with the surface of the ground, as shown in Fig. 1, by releasing the pawl L from contact with the inner end of the lever H by the operator pulling the handle of the bell-crank lever J toward him and depressing the lever E by his foot to turn back the axle-tree, and with it the rake-teeth, as before noted. When the rake-teeth have gathered a sufficient load of material they are elevated from the position shown in Fig. 1 to the position shown in Fig. 2 by the operator pulling the handle of the lever J toward him, forcing the outer end of the lever H into contact with the teeth of the ratchet-wheel I and causing the truck-wheel to perform the operation of turning the axle-tree and lifting the rake-teeth and their gathered load.

We do not claim the employment of a rake operated by horse or other animal power, nor elevating the rake-teeth by the movement of the truck-wheels of the machine; but What we do claim as our invention, and desire to secure by Letters Patent, is—

1. The combination of the curved lever E, roller F, and arm G, with the axle-tree A, for the purpose of depressing and holding the rake-teeth B in contact with the surface of the ground, as herein set forth.

2. The combination of the bell-crank lever J with the levers K and H, pawl L, and ratchet-wheel I, for the purpose of elevating the rake-teeth from the ground and for holding them when so elevated, as herein described.

EDWARD SMITH.
SIDNEY COWLES.

Witnesses:
F. C. BARTHOLOMEW.
E. CHAPMAN MALTBY.